US008281334B2

(12) United States Patent
Shan et al.

(10) Patent No.: US 8,281,334 B2
(45) Date of Patent: Oct. 2, 2012

(54) FACILITATING ADVERTISEMENT PLACEMENT OVER VIDEO CONTENT

(75) Inventors: Ying Shan, Sammamish, WA (US); Yue Zhou, Champaign, IL (US); Xu Liu, Beijing (CN); Ying Li, Bellevue, WA (US); Zhengyou Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 648 days.

(21) Appl. No.: 12/059,255

(22) Filed: Mar. 31, 2008

(65) Prior Publication Data

US 2009/0249386 A1    Oct. 1, 2009

(51) Int. Cl.
*H04N 7/10* (2006.01)
*G06F 3/048* (2006.01)

(52) U.S. Cl. ............... 725/34; 725/40; 725/41; 725/42; 725/43; 725/44; 715/794; 715/795; 715/796; 715/246

(58) Field of Classification Search .............. 725/34, 725/40–44; 715/794–796, 243–246
See application file for complete search history.

(56) References Cited

U.S. PATENT DOCUMENTS

| 5,491,517 | A | | 2/1996 | Kreitman |
| 5,915,250 | A | * | 6/1999 | Jain et al. ............... 707/999.003 |
| 7,027,101 | B1 | * | 4/2006 | Sloo et al. ............... 348/564 |
| 7,231,651 | B2 | | 6/2007 | Pong |
| 7,552,458 | B1 | * | 6/2009 | Finseth et al. ............... 725/34 |
| 8,207,989 | B2 | * | 6/2012 | Mei et al. ............... 345/629 |
| 2003/0030652 | A1 | | 2/2003 | Billmaier |
| 2004/0194131 | A1 | * | 9/2004 | Ellis et al. ............... 725/34 |
| 2005/0086690 | A1 | | 4/2005 | Gilfix |
| 2005/0137958 | A1 | | 6/2005 | Huber |
| 2006/0026628 | A1 | | 2/2006 | Wan |
| 2006/0106710 | A1 | | 5/2006 | Meek |
| 2006/0294538 | A1 | | 12/2006 | Li |
| 2007/0055983 | A1 | | 3/2007 | Schiller |
| 2007/0055985 | A1 | | 3/2007 | Schiller |
| 2007/0124762 | A1 | | 5/2007 | Chickering |

FOREIGN PATENT DOCUMENTS

KR    2006000740    *    6/2006

OTHER PUBLICATIONS

Kongwah Wan, et al., "Advertising Insertion in Sports Webcasts," Multimedia at Work, IEEE Computer Society, Apr.-Jun. 2007, pp. 78-82.

* cited by examiner

*Primary Examiner* — Brian Pendleton
*Assistant Examiner* — Fernando Alcon
(74) *Attorney, Agent, or Firm* — Shook, Hardy & Bacon L.L.P.

(57) ABSTRACT

Systems, methods, computer-readable media, and graphical user interfaces for facilitating advertisement placement over video content are provided. Images within a video are partitioned into image regions. Upon partitioning images into image regions, an intrusiveness score is determined for each image region. Based on the intrusiveness scores, optimal placement of an advertisement within the video is determined.

19 Claims, 10 Drawing Sheets

FACILITATING ADVERTISEMENT PLACEMENT OVER VIDEO CONTENT

BACKGROUND

Today, advertisements are oftentimes placed over video content to provide viewers with information about a product or service. Presenting such advertisements over video content can disrupt a user's viewing experience. In some cases, to overcome viewing disruptions, advertisements are simply placed in a predetermined position, such as the bottom of the video. As critical video content can exist in any portion of a video, such fixed advertisement placement can obscure critical video content.

BRIEF SUMMARY

Embodiments of the present invention relate to systems, methods, graphical user interfaces, and computer-readable media for facilitating advertisement placement over video content. Advertisement placement is important so that the viewing experience is not interrupted. To determine optimal advertisement placement, images within a video are partitioned into image regions. Upon partitioning the images into image regions, an intrusiveness score is determined for each image region. Based on the intrusiveness scores, an optimal placement for an advertisement can be determined. In embodiments, advertisement preferences that indicate, for example, a preferred advertisement location and/or a preferred advertisement time can also be utilized to determine optimal placement for an advertisement.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments are described in detail below with reference to the attached drawing figures, wherein.

DETAILED DESCRIPTION

Figure 1:
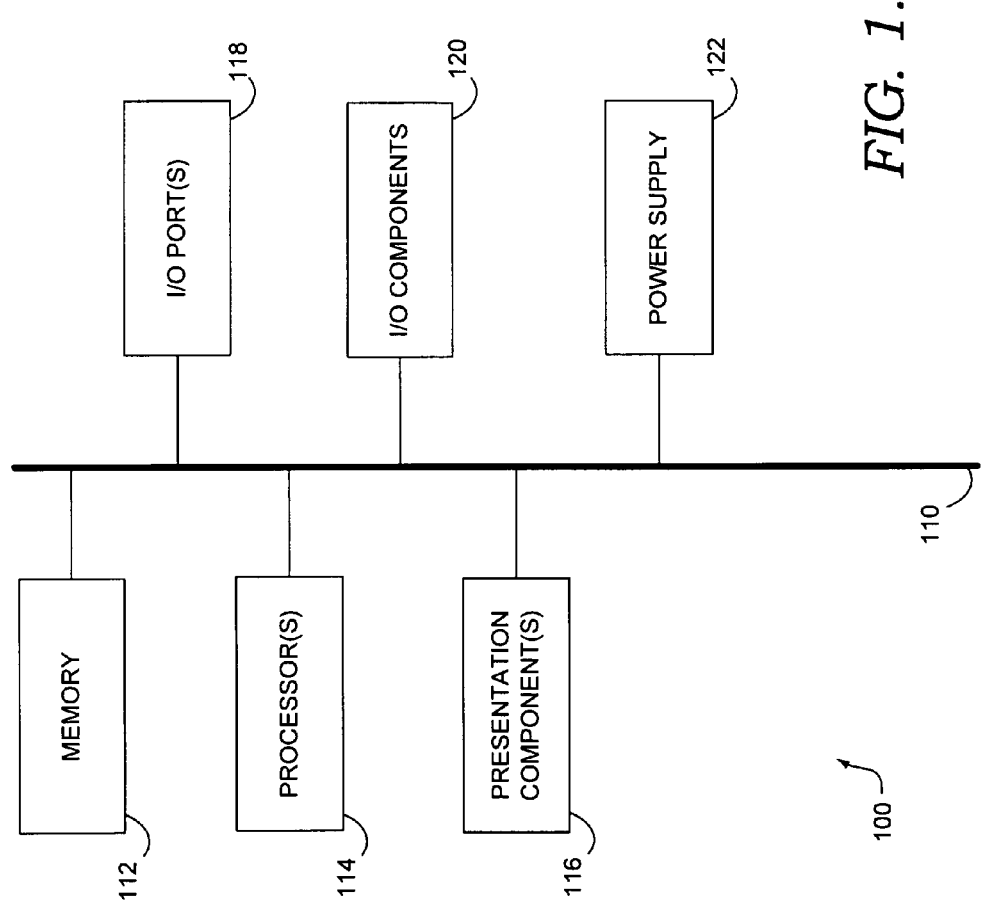
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems, methods, graphical user interfaces and computer-readable media for facilitating advertisement placement over video content. Sample images are analyzed to develop an intrusiveness function. Upon developing the intrusiveness function, the intrusiveness function can be utilized to determine intrusiveness of an advertisement if placed within a particular image region of a target image. Based on the intrusiveness indicated, the optimal placement of an advertisement may be determined. In embodiments, advertisement preferences are also utilized to determine the optimal placement of an advertisement.

Accordingly, in one aspect, the present invention provides one or more computer-readable media having computer-executable instructions embodied thereon that, when executed, perform a method for facilitating advertisement placement relative to video content. The method includes partitioning each of one or more target images of a video into a plurality of image regions; determining an intrusiveness score for each of the plurality of image regions, wherein the intrusiveness score provides an indication of an extent that an advertisement would intrude with video content if placed in a particular position; and based on the intrusiveness scores, determining an advertisement placement for the advertisement relative to the video content.

In another aspect, the present invention provides a method for facilitating advertisement placement over video content. The method includes referencing a plurality of images within a video; partitioning the plurality of images into image regions; determining intrusiveness scores for one or more of the image regions for each of the plurality of images; obtaining advertisement preferences indicating user preferences for placement of an advertisement, wherein the advertisement preferences comprise spatial preferences, temporal preferences, or a combination thereof; and utilizing the intrusiveness scores for the image regions and the advertisement preferences to determine an optimal placement for an advertisement.

In a further aspect, the present invention provides a graphical user interface embodied on a computer-readable medium and executable on a computer. The graphical user interface includes a first display area configured for displaying at least one advertisement preference option field associated with a spatial preference to receive an indication of a desired location for presenting an advertisement; and a second display area configured for displaying at least one advertisement preference option field associated with a temporal preference to receive an indication of a desired time at which to present the advertisement, wherein the indication of the desired location for presenting an advertisement and the indication of the desired time at which to present the advertisement are utilized in combination with an intrusiveness scores for one or more image regions to determine an optimal placement of an advertisement.

Having briefly described an overview of embodiments of the present invention, an exemplary operating environment suitable for implementing embodiments hereof is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks, or implement particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation component include a display device, speaker, printing module, vibrating module, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
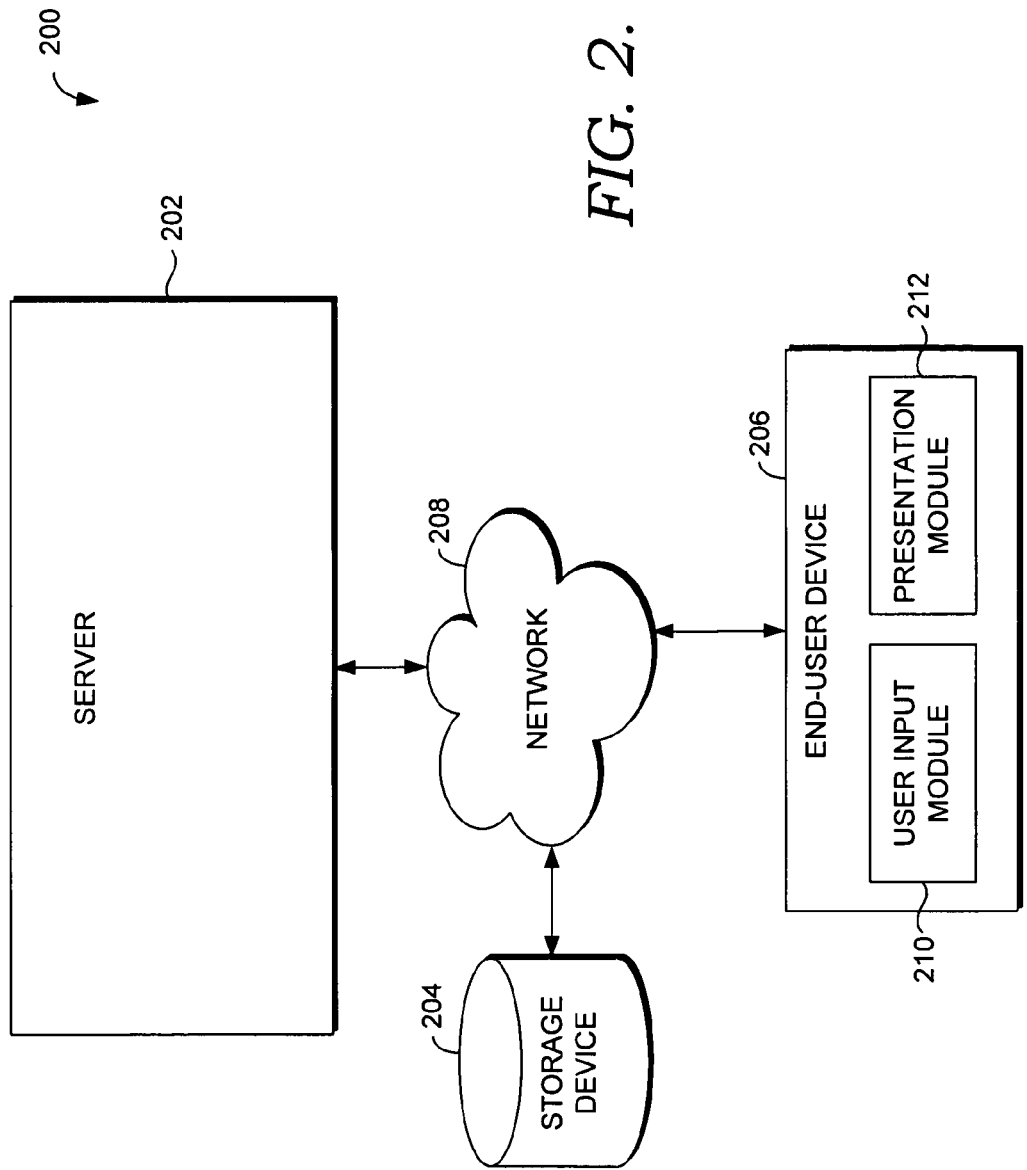
FIG. 2 is a block diagram of an exemplary computing system architecture suitable for use in implementing embodiments of the present invention.

With reference to FIG. 2, a block diagram is illustrated that shows an exemplary computing system architecture 200 configured for use in implementing an embodiment of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components illustrated therein.

Computing system architecture 200 includes a server 202, a storage device 204, an end-user device 206, all in communication with one another via a network 208. The network 208 may include, without limitation, one or more local area networks (LANs) and/or wide area networks (WANs). Such networking environments are commonplace in offices, enterprise-wide computer networks, intranets and the Internet. Accordingly, the network 208 is not further described herein.

The storage device 204 is configured to store information associated with advertisements, advertisement preferences, videos, images, and the like. In embodiments, the storage device 204 is configured to be searchable for one or more of the items stored in association therewith. It will be understood and appreciated by those of ordinary skill in the art that the information stored in the storage device 204 may be configurable and may include any information relevant to advertisements, advertisement preferences, videos, images, and the like. The content and volume of such information are not intended to limit the scope of embodiments of the present invention in any way. Further, though illustrated as a single, independent component, the storage device 204 may, in fact, be a plurality of storage devices, for instance a database cluster, portions of which may reside on the server 202, the end-user device 206, another external computing device (not shown), and/or any combination thereof.

Each of the server 202 and the end-user device 206 shown in FIG. 2 may be any type of computing device, such as, for example, computing device 100 described above with reference to FIG. 1. By way of example only and not limitation, each of the server 202 and the end-user device 206 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

The server 202 may include any type of application server, database server, or file server configurable to perform the methods described herein. In addition, the server 202 may be a dedicated or shared server. One example, without limitation, of a server that is configurable to operate as the server 202 is a structured query language ("SQL") server executing server software such as SQL Server 2005, which was developed by the Microsoft® Corporation headquartered in Redmond, Wash.

Components of server 202 (not shown for clarity) may include, without limitation, a processing unit, internal system memory, and a suitable system bus for coupling various system components, including one or more databases for storing information (e.g., advertisements, advertisement preferences, videos, images, and the like). Each server typically includes, or has access to, a variety of computer-readable media. By way of example, and not limitation, computer-readable media may include computer-storage media and communication media. In general, communication media enables each server to exchange data via network 208. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system architecture 200 is merely exemplary. While the server 202 is illustrated as a single box, one skilled in the art will appreciate that the server 202 is scalable. For example, the server 202 may in actuality include 500 servers in communication. Moreover, the storage device 204 may be included within the server 202 or end-user device 206 as a computer-storage medium. The single unit depictions are meant for clarity, not to limit the scope of embodiments in any form.

As shown in FIG. 2, the end-user device 206 includes a user input module 210 and a presentation module 212. In some embodiments, one or more of the modules 210 and 212 may be implemented as stand-alone applications. In other embodiments, one or both of the modules 210 and 212 may be integrated directly into the operating system of the end-user device 206. It will be understood by those of ordinary skill in the art that the modules 210 and 212 illustrated in FIG. 2 are exemplary in nature and in number and should not be construed as limiting. Any number of modules may be employed to achieve the desired functionality within the scope of embodiments hereof.

The user input module 210 is configured for, among other things, receiving indications to view a video, or portion thereof, receiving indications of advertisement preferences, or receiving indications of intrusiveness, as more fully discussed below. Typically, such indications are input via a user interface (not shown) associated with the end-user device 206, or the like. Upon receiving such indications, the presentation module 212 of the end-user device 206 is configured for presenting, among other things, a video and associated advertisements. In one embodiment, the presentation module 212 presents advertisements over video content utilizing a display device associated with the end-user device 206.

Figure 3:
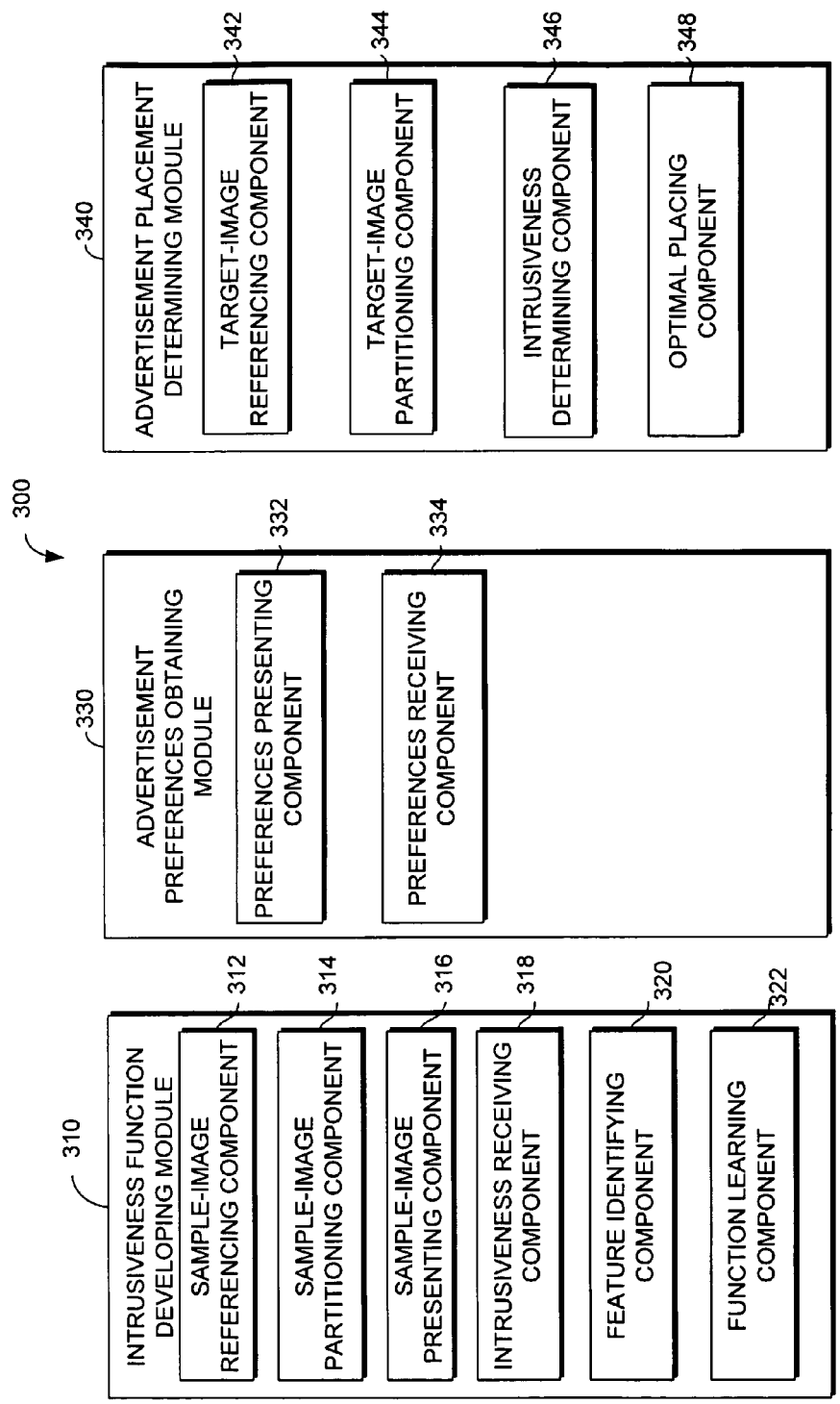
FIG. 3 is a block diagram of an exemplary computer system for use in implementing an embodiment, in accordance with the present invention.

FIG. 3 illustrates an exemplary computer system 300 for facilitating advertisement placement over video content. Such a facilitation of advertisement placement provides optimal placement of an advertisement over video content and, thereby, reduces viewing disruptions. Video content, as used herein, refers to any content presented within a video. A video is a sequence of images. Such a sequence of images represents scenes in motion. As used herein, a video includes video portions, such as, for example, video clips, trailers, and the like.

The term advertisement, as used herein, includes any advertisement including, but not limited to, a text advertisement, an image advertisement, a video advertisement, an animated advertisement, a combination thereof, or any other advertisement capable of providing a message to a user. As used herein, advertisement placement refers to a placement of an advertisement within a video, an image, or portions thereof.

In embodiments, advertisement placement may refer to spatial advertisement placement, temporal advertisement placement, or a combination thereof (i.e., spatial-temporal advertisement placement). Spatial advertisement placement refers to a placement, position, or location of an advertisement within one or more images (i.e., frames) of a video. For example, an advertisement may be placed at the bottom, left-side portion of one or more video images. One skilled in the art will appreciate that exemplary computer system 300 can be configured to facilitate advertisement placement alongside video content. In such a case, spatial advertisement placement can refer to a placement, position, or location of an advertisement near or adjacent to one or more images of a video.

Temporal advertisement placement refers to a time, or duration of time, at which an advertisement is placed within a video. For example, an advertisement may be presented over video content beginning at a time of ten seconds after the beginning of a video. Spatial-temporal advertisement placement refers to a placement of an advertisement within a video at a particular time, or time duration, and at a particular position within, or alongside, one or more images presented at the particular time. For example, an advertisement may be placed at the bottom, left-side portion of one or more images that are presented beginning at a time of ten seconds after the beginning of the video. For the sake of clarity, some embodiments described herein might generally refer to advertisement placement. Such a general reference to advertisement placement includes any of spatial advertisement placement, temporal advertisement placement, or spatial-temporal advertisement placement.

As shown in FIG. 3, an exemplary computer system 300 includes an intrusiveness function developing module 310, an advertisement preferences obtaining module 330, and an advertisement placement determining module 340. In some embodiments, one or more of the illustrated modules and/or components may be implemented as stand-alone applications. In other embodiments, one or more of the illustrated modules and/or components may be integrated directly into the operating system of the server 202, a cluster of servers (not shown) and/or the end-user device 206. It will be understood by those of ordinary skill in the art that the modules and components illustrated in FIG. 3 are exemplary in nature and in number and should not be construed as limiting. Any number of modules and/or components may be employed to achieve the desired functionality within the scope of embodiments hereof. Further, modules and components may be located on any number of servers or computers.

The intrusiveness function developing module 310 is configured to develop an intrusiveness function. An intrusiveness function refers to any function, such as a formula, graph, or algorithm, that can provide an indication of an intrusiveness of an advertisement if placed within, a video, an image, or portions thereof. An intrusiveness function can also refer to any function, such as a formula, graph, or algorithm, that can provide an indication of an intrusiveness of an advertisement if placed alongside, a video, an image, or portions thereof. The intrusiveness function developing module 310 can generate an intrusiveness function and/or enhance an existing intrusiveness function.

In embodiments, the intrusiveness function developing module 310 includes a sample-image referencing component 312, a sample-image partitioning component 314, a sample-image presenting component 316, an intrusiveness receiving component 318, a feature identifying component 320, and a function learning component 322. The sample-image referencing component 312 is configured to reference one or more sample images, i.e., frames. A sample image, as used herein, refers to an image or frame that can be used to develop an intrusiveness function. That is, a sample image is an image that can be analyzed so that an intrusiveness function can be developed. Any number of sample images can be referenced to achieve the desired functionality within the scope of embodiments hereof. In one embodiment, the referenced sample images can be associated with a single video. For example, sample-image referencing component 312 might reference multiple sample images within a single video. Alternatively, the referenced sample images can be associated with a plurality of videos. For example, sample-image referencing component 312 might reference one or more sample images associated with a first video as well as one or more sample images associated with a second video.

The sample images referenced by sample-image referencing component 312 may be stored within a storage device, such as storage device 204. Sample images can be stored independently from the video associated therewith or, alternatively, a video having such images can be stored within a storage device. In an embodiment where videos are stored within a storage device, sample-image referencing component 312 may reference a video within the storage device and, thereafter, reference one or more sample images within the video. One skilled in the art will appreciate that such a storage device may reside within a server or end-user device hosting the intrusiveness function developing module 310 or within a server or end-user device remote from the intrusiveness function developing module 310. A storage device that stores videos and/or sample images might obtain the videos and/or sample images by receiving or retrieving such sample images or videos from, for example, an advertiser; a video producer; a webcrawler; a program administrator or developer; another application, module, or component; or the like. By way of example only, assume a collection of videos (e.g., 10,000 videos) is stored within one or more storage devices. Sample-image referencing component 312 can reference a particular video among the 10,000 videos and, thereafter, reference one or more sample images within the video.

In one embodiment, referenced videos and/or sample images might be selected, for example, by sample-image referencing component 312. In such an embodiment, one or more videos and/or sample images within a video might be randomly selected. For example, upon selecting a video from a collection of videos, several images can be randomly selected from the sequence of images. Alternatively, the sample images and/or videos to be referenced might be selected based on an algorithm or a predetermined selection (e.g., a first, middle, and last image of the video).

The sample-image partitioning component 314 is configured to partition sample images, such as sample images referenced by sample-image referencing component 312. In embodiments, the sample images are partitioned into image regions. An image region, as used herein, refers to a portion, section, or area of an image that represents a potential area for an advertisement to be placed. A sample image may be partitioned into any number of image regions. For example, in one embodiment, a sample image may be partitioned into nine image regions. One skilled in the art will recognize that image regions can be of any shape or size.

The sample-image partitioning component 314 may also be configured to provide a region identifier for each image region. A region identifier provides an identification of a particular image region. Such region identifiers enable a user to identify particular image regions. Region identifiers may include, for example, numbers, letters, or any other character or set of characters that can identify a region. In some embodiments, only a portion of image regions associated with an image may be provided with a region identifier. For example, in some embodiments, it is desirable to obtain information regarding only a portion of image regions. In such a case, only a portion of the image regions may be provided with a region identifier. One skilled in the art will appreciate that the partitioned sample images can be stored within a storage device.

The sample-image presenting component 316 is configured to present sample images such that the sample images can be analyzed. In embodiments, presented sample images provide an indication of image regions, region identifiers, or a combination thereof. One skilled in the art will appreciate that any technique can be utilized to indicate image regions. For example, lines can be used to show distinct image regions. Region identifiers might be presented so that particular image regions can be identified. Sample-image presenting component 316 might also be configured to present additional items such as input fields that can receive information regarding the video, image, image regions, or the like.

Figure 4:
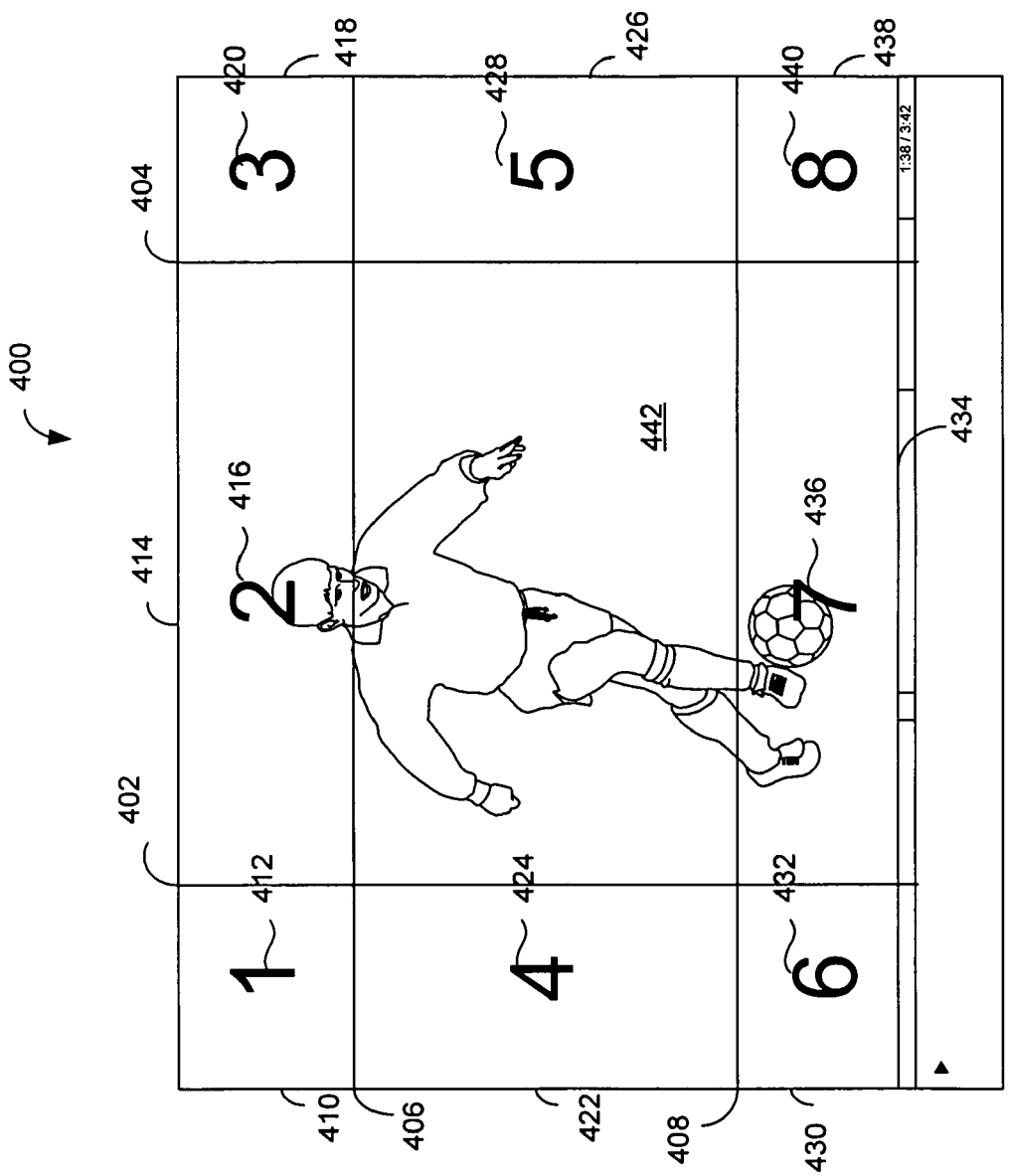
FIG. 4 illustrates an exemplary display of a sample image, in accordance with an embodiment of the present invention.

By way of example only, and with reference to FIG. 4, an exemplary display of a sample image 400 is illustrated. Sample image 400 is partitioned into nine image regions. A first line 402, a second line 404, a third line 406, and a fourth line 408 are presented to provide an indication of image regions. As shown in FIG. 4, first image region 410 includes a first region identifier 412. Second image region 414 includes a second region identifier 416. Third image region 418 includes a third region identifier 420. Fourth image region 422 includes a fourth region identifier 424. Fifth image region 426 includes a fifth region identifier 428. Sixth image region 430 includes a sixth region identifier 432. Seventh image region 434 includes a seventh region identifier 436. Eighth image region 438 includes an eighth region identifier 440. As is illustrated in FIG. 4, because information regarding a ninth image region 442 is not desired, ninth image region 442 does not include a region identifier.

One skilled in the art will appreciate that, in some cases, sample images might remain as a single image region. Accordingly, such sample images are not partitioned. For example, in embodiments where intrusiveness of an advertisement is determined for advertisements placed alongside, near, or adjacent to one or more images, the entire image may be treated as an image region.

Referring again to FIG. 3, the intrusiveness receiving component 318 is configured to receive indications of intrusiveness of an advertisement if placed within an image region.

Intrusiveness, as used herein, refers to the extent or degree that an advertisement would intrude or interfere with video content displayed within a particular image region if the advertisement is placed therein. Intrusiveness, in some embodiments, can also refer to the extent or degree that an advertisement would intrude or interfere with a user's viewing experience if an advertisement is placed in a particular position, such as alongside or adjacent to video content. In one embodiment, labelers can provide an indication of intrusiveness (i.e., intrusiveness indication) based on the labeler's perceptions. A labeler, as used herein, refers to an individual that provides indications of intrusiveness of an advertisement if placed within an image region. A labeler may utilize a sample image presented by sample-image presenting component 316 to provide such an indication. Any input mechanism may be used to provide an indication of intrusiveness, such as, for example, selecting an image region (e.g., selecting a most and least intrusive image region by clicking on the image region), using drag and drop, providing input into input fields, using a touch screen, using audio selection, or the like.

In one embodiment, a labeler may provide a score (i.e., intrusiveness score) that indicates intrusiveness of an advertisement if placed within a particular position (e.g., image region). For example, a labeler may provide a score (e.g., 1-10, high, medium, or low) for one or more image regions that represents an indication of intrusiveness. In an alternative embodiment, an indication of intrusiveness may include a ranking of an image region relative to one or more other image regions. For example, a user may rank one or more image regions using a ranking system of 1-9 or most intrusive and least intrusive image regions. By way of example and with reference to FIG. 4, a labeler may select image region seven 434 as the most intrusive image region and image region one 412 as the least intrusive image region.

Indications of intrusiveness may be provided for any number of positions or image regions. In one embodiment, a user interface presented to a labeler limits the number of image regions for which an indication of intrusiveness can be provided. For example, a user interface may restrict the image regions for which an intrusiveness indication can be provided (e.g., a select number of image regions have region identifiers or are selectable) or restrict the number of intrusiveness indications that can be received (e.g., labeler can identify only most intrusive and least intrusive image regions).

The feature identifying component 320 is configured to analyze sample images, or portions thereof, and to identify features corresponding with the sample images, or portions thereof. One skilled in the art will recognize that feature identifying component 320 can identify features at any time. That is, features can be identified prior to or following receiving an indication of intrusiveness. A feature, as used herein, refers to any characteristic that describes or indicates at least one aspect of an image region. A feature may include, for example, a color, an image gradient, and the like. Image gradient refers to gradient magnitude and/or a gradient direction (i.e., direction of intensity change). A feature may be a spatial feature and/or a temporal feature. A spatial feature refers to a feature within a single image. A temporal feature refers to a feature within multiple images. A temporal feature can be computed, for example, from motion vectors of pixels tracked over multiple frames of a video.

In one embodiment, feature identifying component 320 analyzes each image region of a sample image. In an alternative embodiment, specific image regions of a sample image are analyzed. For example, the image regions provided with an intrusiveness indication may be examined. In analyzing image regions, in embodiments, each pixel of an image region may be analyzed to determine features present in the image region. One skilled in the art will appreciate that feature identifying component 320 may, in some embodiments, analyze an image, or a portion thereof, and identify features on one occasion even though multiple instances of intrusiveness indications can be received. Such features can be stored in a storage device in association with the images or image portions.

Feature identifying component 320 may identify relevant features, all recognizable features, or features that exceed a particular threshold. In an embodiment where relevant features are identified, feature identifying component 320 may utilize an algorithm or lookup system to determine the relevant features. In an embodiment where features that exceed a particular threshold are identified, such a threshold may be based on input from a labeler, an advertiser, a video producer, a program developer or administrator, or, alternatively, based on another application, module, component, algorithm, lookup table, or the like.

In one embodiment, feature identifying component 320 extracts features from images, or portions thereof. Features may be extracted so that the features can, thereafter, be identified, such as by feature identifying component 320, and/or utilized to develop an intrusiveness function. Alternatively, the extracted features may be stored, for example, so that the features may be communicated or retrieved at a later instance.

The function learning component 322 is configured to learn an intrusiveness function. An intrusiveness function, as used herein, refers to function that can be used to determine an intrusiveness of an advertisement if placed over, or alongside, video content within a target image or image region. A target image refers to an image on, or alongside, which an advertisement may be placed. One skilled in the art will appreciate that an image might be used as both a sample image and a target image. In one embodiment, function learning component 322 learns an intrusiveness function based on a human and computer analysis of sample images. Accordingly, intrusiveness indicated by labelers and features identified, such as features identified by feature identifying component 320, can be used to develop an intrusiveness function. Any amount of information pertaining to sample image can be collected and utilized to develop an intrusiveness function.

In one embodiment, intrusiveness functions are developed (e.g., generated and/or updated) automatically. For example, upon obtaining a particular amount of data or upon the lapse of a time or time duration, an intrusiveness function is automatically generated or updated. In another embodiment, the development of an intrusiveness function is initiated based on an indication, such as a user indication. That is, a program administrator, for example, may provide an indication to generate or update an intrusiveness function.

Advertisement preferences obtaining module 330 is configured to obtain advertisement preferences. An advertisement preference, as used herein, refers to a preference of a placement of an advertisement (e.g., spatial and/or temporal placement) within, or alongside, a video, or portion thereof. In one embodiment, advertisement preferences obtaining module 330 includes a preferences presenting component 332 and a preferences receiving component 334.

The preferences presenting component 332 is configured to present preference options such that a user can provide user input indicating preferences for the advertisement placement. A user may include, for example, an advertiser, a video producer, a viewer, a program developer or administrator, associations therewith, and the like. In embodiments, the preferences presenting component 332 may include spatial optimization options, temporal optimization options, or a combination thereof. Spatial optimization options, as used herein, provide options for a user to provide preferences that can be utilized to determine an optimal spatial placement of an advertisement within a target image and/or video. Temporal optimization options, as used herein, provides options for a user to provide preferences that can be utilized to determine an optimal temporal placement of an advertisement within a video. Spatial-temporal optimization options, as used herein, provides options for a user to provide preferences that can be utilized to determine an optimal spatial placement of an advertisement within a target image and/or video and an optimal temporal placement an advertisement within the video. Such preference options may be presented to a user via a graphical user interface, as described more fully below. One skilled in the art will appreciate that a preference option may be presented in the form of an input field in which a user may input a preference.

The preferences receiving component 334 is configured to receive advertisement preferences. In embodiments, preferences receiving component 334 receives preferences provided by a user. In such an embodiment, the user may provide such advertisement preferences utilizing the preference options presented by the preferences presenting component 332.

The advertisement placement determining module 340 is configured to determine optimal placement of an advertisement within a video, or portion thereof. One skilled in the art will appreciate that, in some embodiments, advertisement placement determining module 340 might be configured to determine optimal placement of an advertisement alongside a video, or portion thereof. In one embodiment, advertisement placement determining module 340 includes a target-image referencing component 342, a target partitioning component 344, an intrusiveness determining component 346, and an optimal placing component 348.

The target-image referencing component 342 is configured to reference one or more target-images, i.e., frames, of a video. Any number of target images, including all images within a video, can be referenced to achieve the desired functionality within the scope of embodiments hereof.

The target images referenced by target-image referencing component 342 may be stored within a storage device, such as storage device 204. Target images can be stored independent from a video associated therewith, or alternatively, a video having such images can be stored within a storage device. In an embodiment where videos are stored within a storage device, target-image referencing component 342 may reference a video and, thereafter, reference one or more target images within the video. One skilled in the art will appreciate that such a storage device may reside within a server or end-user device hosting the advertisement placement determining module 340 or within a server or end-user device remote from the advertisement placement determining module 340. A storage device that stores video and/or target images might obtain the videos and/or target images by receiving or retrieving such images or videos from an advertiser; a video producer; a webcrawler; a program administrator or developer; another application, module, or component; or the like. By way of example only, assume a collection of videos (e.g., 10,000 videos) is stored within one or more storage devices. Target-image referencing component 342 can reference a particular video and, thereafter, reference one or more target images within the video.

In one embodiment, videos and/or target images to be referenced might be selected, for example, based on a user indication. For example, a user may select to view a video. Upon such a selection to view a video, images within the video might be referenced. Alternatively, the target images and/or videos to be referenced may be selected based on an algorithm or a predetermined selection (e.g., as a video is stored within a storage device).

The target-image partitioning component 344 is configured to partition target images, such as target images referenced by target-image referencing component 342. In embodiments, the target images are partitioned into image regions. An image may be partitioned into any number of image regions. For example, in one embodiment, an image may be partitioned into nine image regions. One skilled in the art will recognize that image regions can be of any shape or size. In one embodiment, target-image partitioning component 344 partitions images into image regions that are of approximately the same size and shape as the image regions associated with the images.

One skilled in the art will appreciate that, in some cases, target images might remain as a single image region. Accordingly, such sample images are not partitioned. For example, in embodiments where intrusiveness of an advertisement is determined for advertisements placed alongside, near, or adjacent to one or more images, the entire image may be treated as an image region.

The intrusiveness determining component 346 is configured to determine intrusiveness of an advertisement if placed over video content within a target image. Additionally, or alternatively, intrusiveness determining component 346 can be configured to determine intrusiveness of an advertisement is placed alongside video content within a target image. In embodiments, the intrusiveness determining component 346 can utilize an intrusiveness function developed by intrusiveness function developing module 310. In one embodiment, the use of such an intrusiveness function provides a score indicating intrusiveness (i.e., intrusiveness score). Such an intrusiveness score may, for example, be a score between 0 and 1 or between 0 to 100, or the like. One skilled in the art will appreciate that an intrusiveness score is not limited to a value. Rather, an intrusiveness score may be a text, symbols, values, or any other indication of intrusiveness.

In embodiments, the intrusiveness function utilizes features of the target image or image regions to determine an intrusiveness score for an image or image region. For example, spatial features, such as textures, and/or temporal features, such as motion vectors, can be utilized to determine an intrusiveness score. In addition, one or more features from an audio stream associated with the video can also be used to determine an intrusiveness score. In such embodiments, intrusiveness determining component 346 may also be configured to analyze, identify, and/or extract features within target images or image regions.

In one embodiment, intrusiveness determining component 346 may determine intrusiveness for each image region of an image for each image in a video. Alternatively, intrusiveness determining component 346 may determine intrusiveness for particular image regions of images and/or particular images of a video. An indication of the particular image regions and/or images for which intrusiveness should be determined may be provided, for example, by an algorithm or based on user input (e.g., advertisement preferences obtaining module 330). One skilled in the art will appreciate that intrusiveness scores can be stored within a storage device for use at a later time.

The optimal placing component 348 is configured to determine an optimal placement for an advertisement within a video, or portion thereof. In embodiments, optimal placing component 348 may determine the least intrusive placement for an advertisement over video content. In cases where multiple image regions are considered minimally intrusive, a default placement or algorithm may be utilized to select among the minimally intrusive placements. As can be appreciated, in embodiments, optimal placing component 348 determines an optimal placement for an advertisement alongside a video, or portion thereof.

Figure 5:
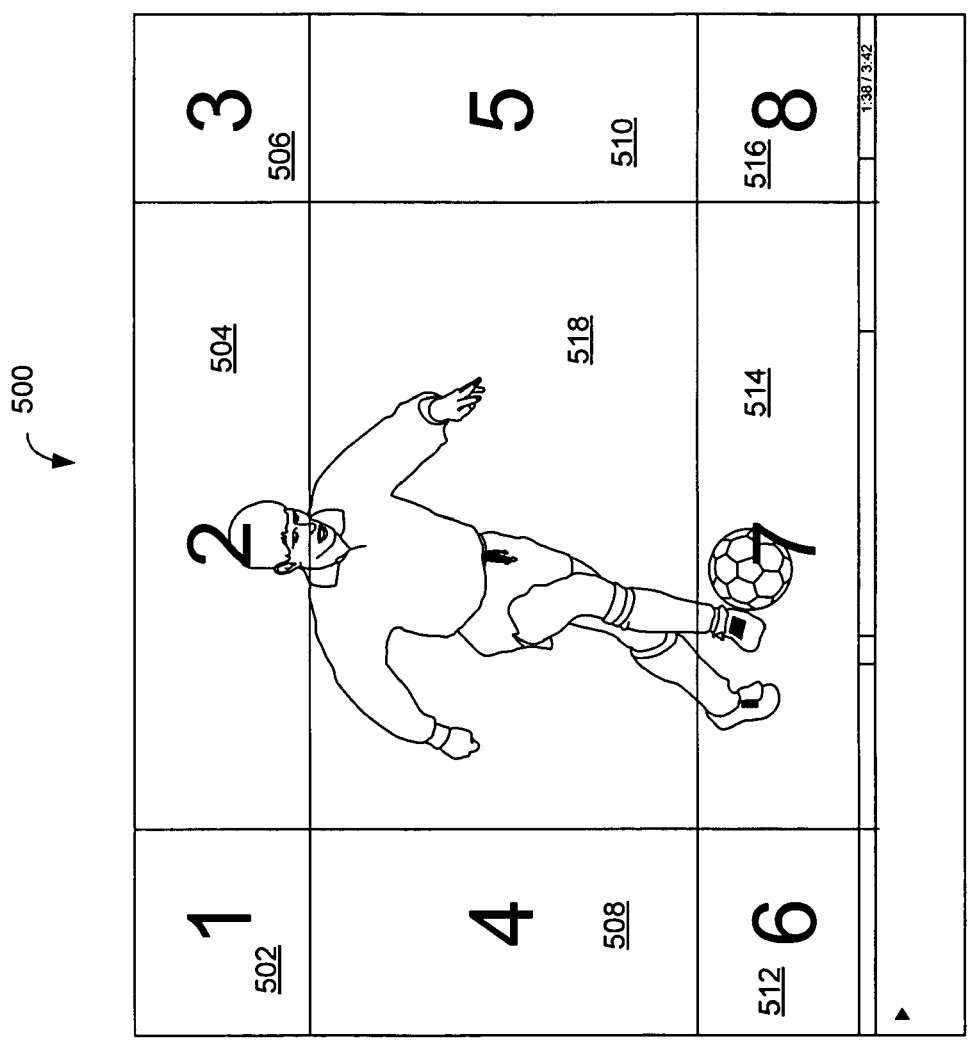
FIG. 5 illustrates an exemplary display of a partitioned target image, in accordance with an embodiment of the present invention.

In one embodiment, the optimal placing component 348 may determine an optimal spatial placement for an advertisement to be presented over video content. To determine optimal spatial placement, optimal placing component 348 may utilize an algorithm and/or compare the intrusiveness scores determined by intrusiveness determining component 346. By way of example only, with reference to FIG. 5, assume FIG. 5 is a target image 500 partitioned into nine regions. Further assume that each of image region one 502, image region three 506, image region four 508, image region five 510, image region six 512, and image region eight 516 have an intrusiveness score of one-tenth on a scale of 0 to 1. Such an intrusiveness score of one-tenth indicates that placing an advertisement over the video content of such regions does not intrude or interfere with the video content. Assume that image region two 504 has an intrusiveness score of one-half and image region seven 514 has an intrusiveness score of nine-tenths. In such a case, it may be determined an advertisement placed over video content of any of region one 502, region three 506, region four 508, region five 510, region six 512 and region eight 516 would be minimally intrusive. In such a case, the optimal placing component 348 may select, for example, one of the minimally intrusive regions randomly or based on a default or other criteria, such as a user preference for advertisement placement.

Optimal placing component 348 can also determine optimal spatial placement for an advertisement over a period of time or for a particular number of images. That is, optimal spatial placement is determined for a set of sequential images such that the advertisement is presented to a viewer for a time duration. In such a case, intrusiveness determining component 346 may determine an intrusiveness score for multiple image regions within a target image and for multiple target images within a video. For example, intrusiveness determining component 346 may determine an intrusiveness score for each image region within a target image and for each target image within a video. Assume that it is desirable to place an advertisement within a video for ten seconds and that in one second of video there are 30 images and, therefore, in ten seconds of video there are 300 images. Further assume that an intrusiveness score for each image region within a set of 300 images is determined. In such a case, aggregate scores for each of the image regions are calculated such that each image region has an aggregated intrusiveness score. As a result, an aggregated intrusiveness score may be a total of intrusiveness scores, an average of intrusiveness scores, or an otherwise aggregated score. Accordingly, the intrusiveness scores for a first image region for each of the 300 images are aggregated to result in an aggregated intrusiveness score associated with the first image region. Similarly, an aggregated intrusiveness score is calculated for each of the remaining image regions. Such aggregated intrusiveness scores may then be utilized within an algorithm or compared to determine optimal placement for an advertisement for the specified ten seconds of video.

In another embodiment, optimal placing component 348 may determine an optimal temporal placement for an advertisement to be presented over video content. To determine optimal temporal placement, optimal placing component 348 may utilize an algorithm and/or compare intrusiveness scores determined by intrusiveness determining component 346. For example, assume it is desired that an advertisement is placed within a particular image region. As such, optimal placing component 348 may determine the time (i.e., least intrusive time), or time duration, at which the advertisement should be placed over the video content within that region such that minimal intrusion occurs. Accordingly, it may be determined to place the advertisement in the particular image region after 30 seconds of presenting the video such that the viewing experience will not be disrupted. Such an optimal temporal placement can be determined, for example, by utilizing a sliding window on a temporal axis that aggregates scores of image regions and selects the temporal location of the window with the lowest aggregated score.

Optimal placing component 348 may also determine an optimal spatial-temporal placement for an advertisement to be presented over video content. To determine optimal spatial-temporal placement, optimal placing component 348 may utilize an algorithm and/or compare intrusiveness scores determined by intrusiveness determining component 346. In embodiments, optimal spatial-temporal placement for an advertisement can be any combination of optimal spatial placement and optimal temporal placement. Accordingly, the optimal spatial placement and optimal temporal placement may be weighted such that varying levels of importance can be given to the spatial or temporal placement of an advertisement.

In some embodiments, optimal placing component 348 may utilize advertisement preferences, such as advertisement preferences obtained by advertisement preferences obtaining module 330, to determine an optimal placement of an advertisement within a video, or alongside a video. Advertisement preferences may include, for example, an indication of a preferred advertisement position (i.e., the location of the desired advertisement placement); an indication of a preferred advertisement length (i.e., the desired length of time for displaying the advertisement); an indication of a preferred time for displaying advertisement (i.e., the desired time for displaying the advertisement); an indication of the preferred size of the advertisement; an indication of the preferred video content; and the like.

Optimal placing component 348 may utilize advertisement preferences to reduce the number of advertisement placement options. For example, assume a user selects the bottom of a video content for a desired advertisement placement. In such a case, optimal placing component 348 may select an optimal spatial placement of an advertisement from among the three bottom image regions (e.g., left, right, and center). In such a case, intrusiveness determining component 346 may also utilize such advertisement preferences to reduce the number of image regions for which an intrusiveness score is calculated. As such, intrusiveness scores may only be calculated for the bottom three image regions.

Alternatively, optimal placing component 348 may utilize advertisement preferences to determine an optimal advertisement placement. For example, advertisement preferences may be weighted and used by an algorithm to select an optimal advertisement placement. Advertisement preferences may also be utilized to determine optimal placement when there are two or more minimally intrusiveness advertisement placement options. In such a case, optimal placing component 348 may reference the advertisement preferences to select an optimal placement from among the minimally intrusive advertisement placement options.

Figure 6:
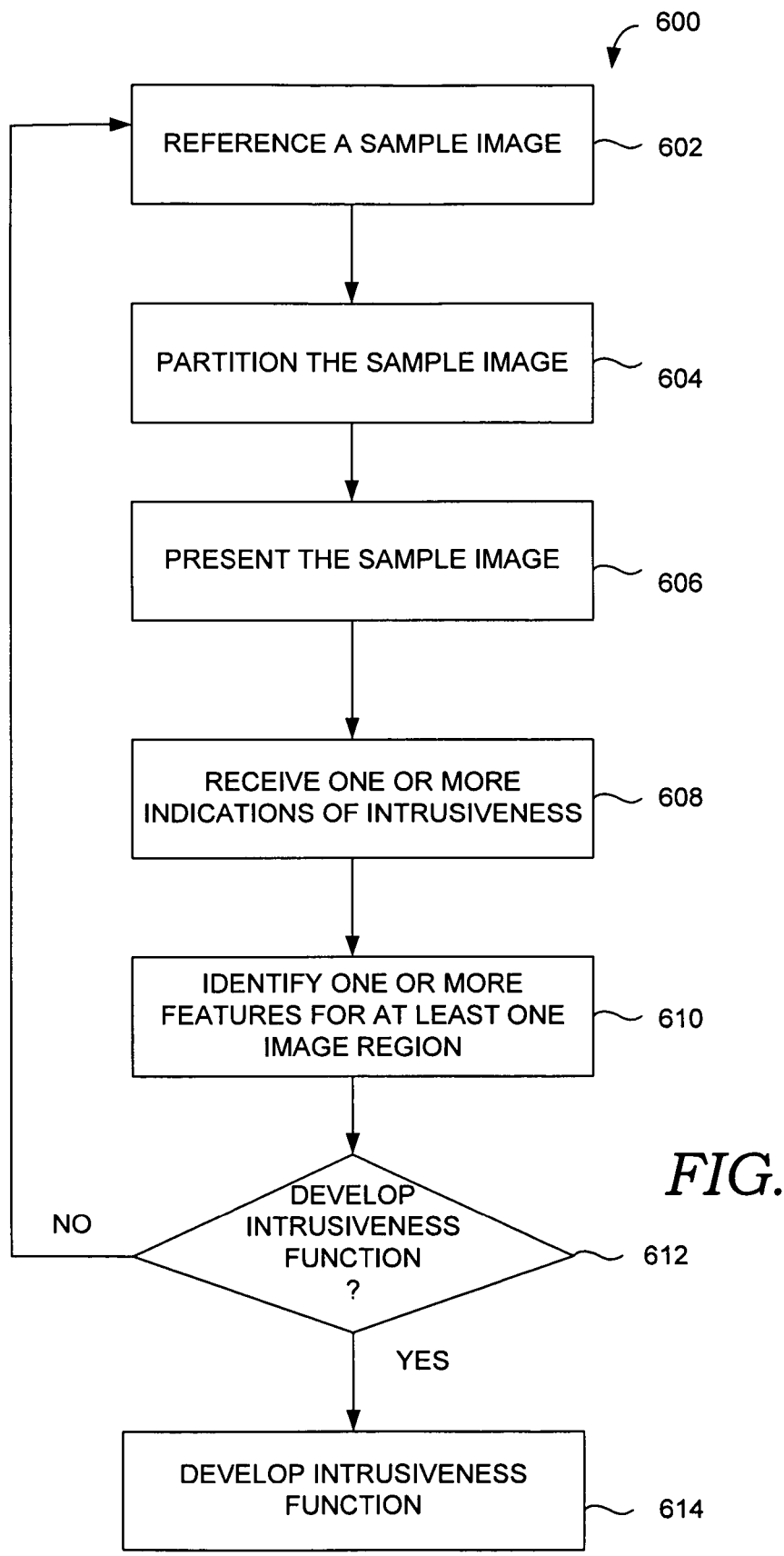
FIG. 6 is a flow diagram illustrating an exemplary method for developing an intrusiveness function, in accordance with an embodiment of the present invention.

With reference to FIG. 6, a flow diagram is illustrated showing a method 600 for developing an intrusiveness function in accordance with an embodiment of the present invention. Method 600 is but one example of a suitable method and is not intended to suggest any limitation as to the scope of the invention. Initially, as indicated at block 602, a sample image is referenced. Upon referencing a sample image, at block 604, the sample image is partitioned into a plurality of image regions. The partitioned sample image is presented at block 606. Subsequently, one or more indications of intrusiveness are received. This is indicated at block 608. At block 610, one or more features are identified for at least one image region. Subsequently, at block 612, it is determined whether to develop an intrusiveness function. If it is determined that an intrusiveness function should not be developed, the method returns to block 602 to continue analyzing sample images. If it is determined that an intrusiveness should be developed, at block 614, an intrusiveness function is developed.

Figure 7:
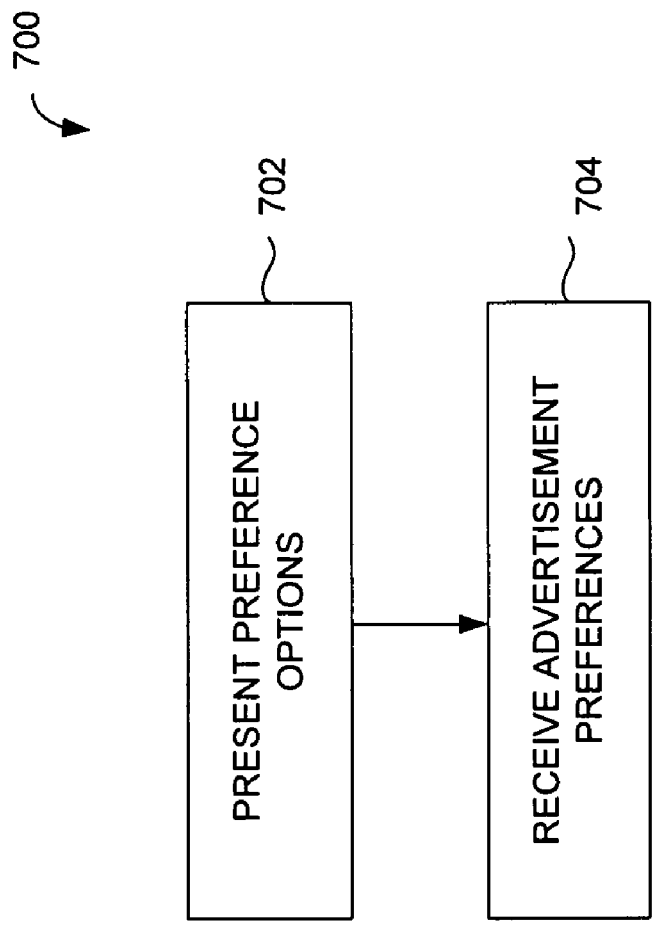
FIG. 7 is a flow diagram illustrating an exemplary method for obtaining advertisement preferences, in accordance with an embodiment of the present invention.

Referring now to FIG. 7, a flow diagram is illustrated showing a method 700 for obtaining advertisement preferences in accordance with an embodiment of the present invention. Method 700 is but one example of a suitable method and is not intended to suggest any limitation as to the scope of the invention. Initially, as indicated at block 702, preference options are presented. Subsequently, at block 704, one or more advertisement preferences are received.

Figure 8:
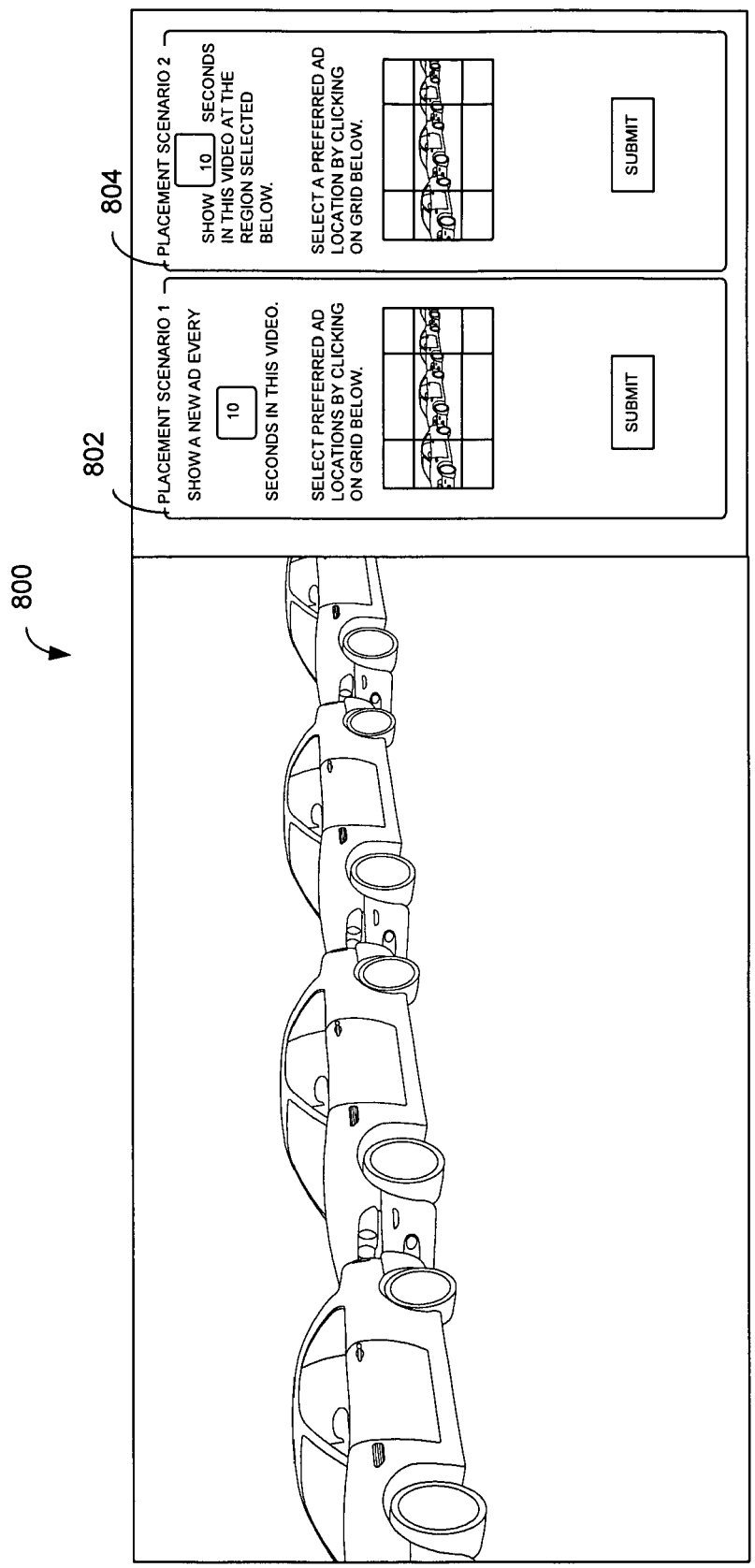
FIG. 8 is an exemplary display of a graphical user interface for obtaining advertisement preferences, according to an embodiment of the present invention.

FIG. 8 illustrates an exemplary display of a graphical user interface for obtaining advertisement preferences, according to embodiments of the present invention. The graphical user interface may be any electronic display for displaying advertisement preference options and receiving user input. The graphical user interface described herein is displayed on a computing device. A user can interact with the displayed graphical user interface using well known input components, such as, for example, a mouse, a joystick, a stylus, a touch screen, or the like.

In operation, advertisement preference options are displayed allowing users to provide advertisement preferences. The advertisement preference options may include spatial placement options 802 and/or temporal placement options 804. As illustrated in FIG. 8, spatial placement options 802 includes an input area for inputting preferences for spatially positioning an advertisement within video and/or target images. Spatial placement options 802 may include an indication to select preferred advertisement locations. In embodiments, the advertisement locations can be selected by clicking on a portion of the image (e.g., a portion of a grid), inputting one or more weights for image regions, and the like. Spatial placement options 802 can also include an input area for inputting a number of seconds after which a new advertisement should be displayed in the video. Temporal placement options 804 includes an input area for inputting preferences for temporally positioning advertisements within a video and/or target images. Temporal placement options 804 may include an indication to select a preferred advertisement location. In embodiments, the preferred advertisement locations can be selected by clicking on a portion of a displayed image (e.g., a portion of a grid or partitioned image), inputting one or more weights for image regions, and the like. Temporal placement options 804 can also include an input area for inputting a number of seconds that the advertisement should be displayed in the video at the selected image region. One skilled in the art will appreciate that spatial placement options 802 and temporal placement options 804 can be separately presented to a user. As can be appreciated, any input areas may be included that allows a user to input preferences for displaying advertisements.

Figure 9:
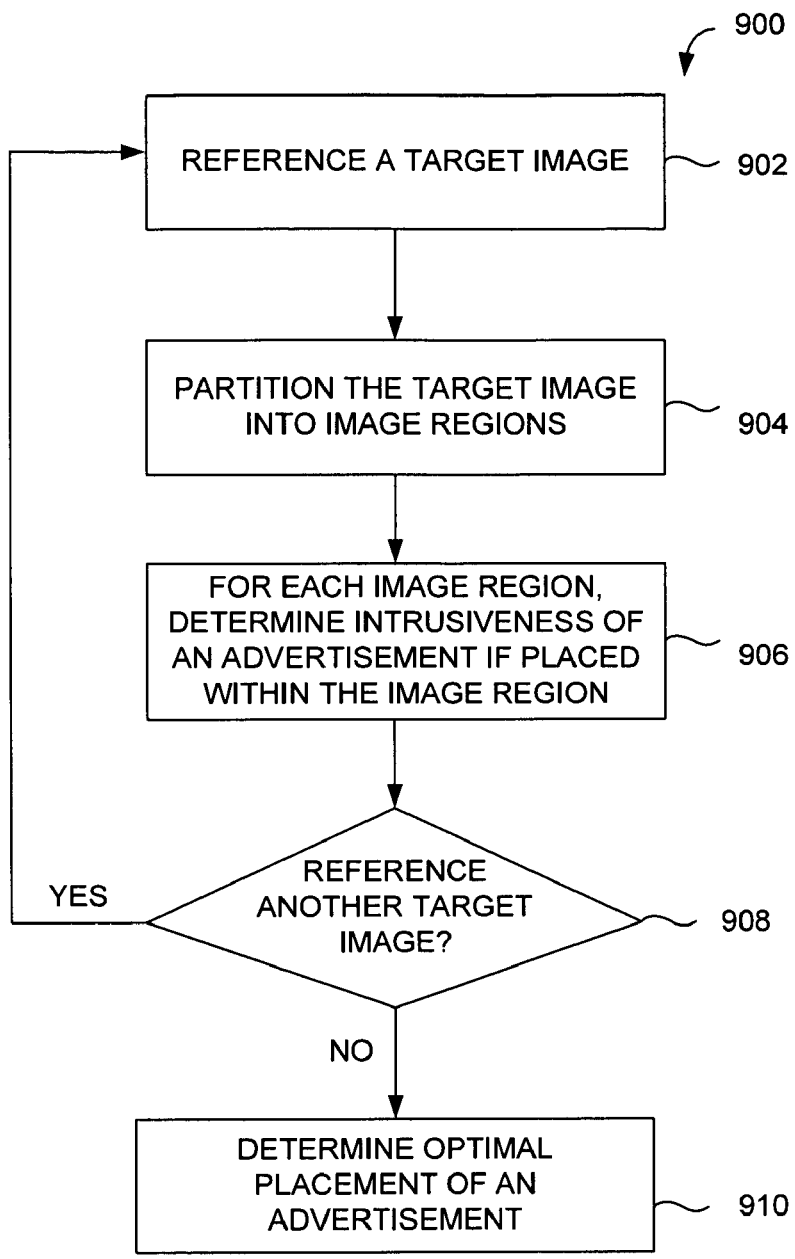
FIG. 9 is a flow diagram illustrating an exemplary method for determining advertisement placement, in accordance with an embodiment of the present invention.

Referring now to FIG. 9, a flow diagram is illustrated showing a method 900 for determining advertisement placement in accordance with an embodiment of the present invention. Initially, as indicated at block 902, a target image is referenced. The referenced target image is partitioned into image regions at block 904. Thereafter, at block 906, for each image region, determine intrusiveness of an advertisement if placed over video content within the image region. At block 908, it is determined if another target image is to be referenced. If another target image is to be referenced, the process returns to block 902 to reference a target image. If another target image is not to be referenced, optimal placement of an advertisement is determined at block 910.

Figure 10:
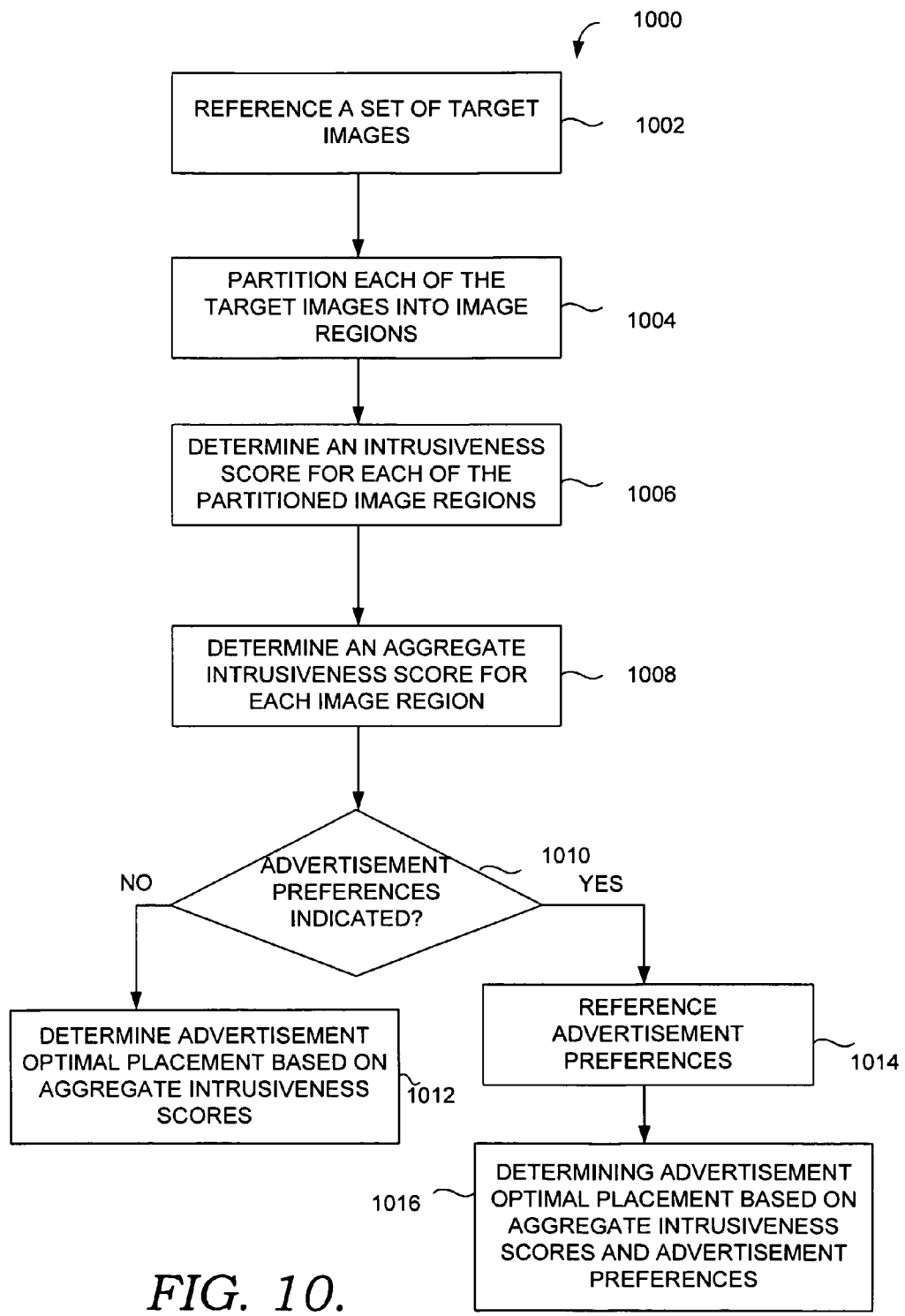
FIG. 10 is a flow diagram illustrating an exemplary method for determining advertisement placement utilizing advertisement preferences.

With reference to FIG. 10, a flow diagram is illustrated showing a method 1000 for determining advertisement placement utilizing advertisement preferences in accordance with an embodiment of the present invention. Initially, as indicated at block 1002, a set of target images are referenced. At block 1004, each of the target images within the set are partitioned into image regions. Subsequently, an intrusiveness score is determined for each of the partitioned image regions, as indicated at block 1006. At block 1008, an aggregate intrusiveness score is determined for each image region. At block 1010, it is determined if any advertisement preferences are indicated. If it is determined at block 1010, that no advertisement preferences are indicated, the optimal placement for the advertisement is determined based on the aggregate intrusiveness score. This is indicated at block 1012. If, however, it is determined at block 1010, that advertisement preferences are indicated, the advertisement preferences are referenced at block 1014. At block 1016, an optimal placement for the advertisement is determined based on the aggregate intrusiveness score as well as the advertisement preferences.

Embodiments described herein are intended in all respects to be illustrative rather than restrictive. Alternative embodiments will become apparent to those of ordinary skill in the art without departing from the scope of embodiments described herein.

From the foregoing, it will be seen that embodiments of the present invention are well adapted to attain ends and objects set forth above, together with other advantages which are obvious and inherent to the systems and methods described. It will be understood that certain features and sub-combinations are of utility and may be employed without reference to other features and sub-combinations. This is contemplated by and is within the scope of the claims.

What is claimed is:

1. One or more computer-readable storage devices having computer-executable instructions embodied thereon that, when executed, perform a method for facilitating advertisement placement relative to video content, the method comprising:

partitioning a first target image of a video into at least a first region and a second region and a second target image of the video into the at least the first region and the second region, wherein the second target image is subsequent to the first target image determining a first intrusiveness score for the first region of the first target image, a second intrusiveness score for the second region of the first target image, a third intrusiveness score for the first region of the second target image, and a fourth intrusiveness score for the second region of the second target image, wherein each of the intrusiveness scores provides an indication of an extent that an advertisement would intrude with video content if placed in a particular position;

aggregating the first intrusiveness score for the first region of the first target image with the third intrusiveness score for the first region of the second target image to attain a first aggregate intrusiveness score associated with the first aggregating the second intrusiveness score for the second region of the first target image with the fourth intrusiveness score for the second region of the second target image to attain a second aggregate intrusiveness score associated with the second region;

comparing the first aggregate intrusiveness score associated with the first region to the second aggregate intrusiveness score associated with the second region to identify a least intrusive image region; and selecting the least intrusive image region of the corresponding target image for placement of the advertisement relative to the video content based on the comparison of the aggregate intrusiveness scores of the first region and the second region.

2. The computer-readable media of claim 1, wherein each of the intrusiveness scores is determined using an intrusiveness function and one or more image features identified from the one or more target images.

3. The computer-readable media of claim 2, wherein the one or more image features include a spatial feature, a temporal feature, or a combination thereof.

4. The computer-readable media of claim 1, wherein each of the intrusiveness scores is determined using an intrusiveness function and one or more features identified from an audio stream associated with the one or more target images.

5. The computer-readable media of claim 1, wherein the advertisement placement comprises a spatial advertisement placement, wherein the spatial advertisement placement refers to a location of the advertisement within one or more images of a video, a temporal advertisement placement, wherein the temporal advertisement placement refers to a time or duration of time at which an advertisement is to be placed within a video, or a combination thereof.

6. The computer-readable media of claim 1, wherein the advertisement placement comprises a placement over video content, a placement alongside video content, or a combination thereof.

7. The computer-readable media of claim 1 further comprising presenting the advertisement within the video in the determined advertisement placement.

8. The computer-readable media of claim 1 further comprising referencing advertisement preferences provided by an advertiser.

9. The computer-readable media of claim 8, wherein the referenced advertisement preferences are utilized to determine advertisement placement.

10. A method for facilitating advertisement placement over video content, the method comprising:

referencing a plurality of images within a video;

partitioning the plurality of images into image regions;

determining, via a computing device, intrusiveness scores for one or more of the image regions for each of the plurality of images;

calculating an aggregate intrusiveness score for each of the one or more image regions, the aggregate intrusiveness score for a particular image region comprising an aggregate of the intrusiveness scores associated with the particular image region for each of the referenced plurality of images within the video;

obtaining one or more advertisement preferences indicating a user preference for spatial placement of an advertisement that indicates a desired location for spatial placement of the advertisement; and utilizing a comparison of the aggregate intrusiveness scores for the image regions to one another and the one or more advertisement preferences for spatial placement to determine an optimal spatial placement for an advertisement for a period of time or for a number of images.

11. The method of claim 10 further comprising displaying the advertisement within the video.

12. The method of claim 10 further comprising storing the intrusiveness scores, the one or more advertisement preferences, the optimal placement, or a combination thereof.

13. The method of claim 10 further comprising referencing the video.

14. The method of claim 10, wherein the intrusiveness scores comprise a value.

15. The method of claim 10, wherein the image region comprises a portion, section, or area of an image that represents a potential location for an advertisement to be placed.

16. The method of claim 15, wherein the image region comprises a rectangular shape.

17. The method of claim 10, wherein the intrusiveness scores are determined utilizing an intrusiveness function, the intrusiveness function comprising a function that can be used to determine an intrusiveness of an advertisement if placed over video content within a target image or image region.

18. The method of claim 17, wherein the intrusiveness function is automatically generated based on one or more features associated with sample images and intrusiveness indications.

19. One or more computer-readable storage devices having computer-executable instructions embodied thereon that, when executed, perform a method for facilitating advertisement placement relative to video content, the method comprising: referencing a plurality of images within a video; partitioning the plurality of images into image regions;

determining, via a computing device, intrusiveness scores for one or more of the image regions for each of the plurality of images;

calculating an aggregate intrusiveness score for each of the one or more image regions, the aggregate intrusiveness score for a particular image region comprising an aggregate of the intrusiveness scores associated with the particular image region for each of the referenced plurality of images within the video;

obtaining one or more advertisement preferences indicating a user preference for spatial placement of an advertisement that indicates a desired location for spatial placement of the advertisement; and utilizing a comparison of the aggregate intrusiveness scores for the image regions to one another and the one or more advertisement preferences for spatial placement to determine an optimal spatial placement for an advertisement for a period of time or for a number of images.

* * * * *